United States Patent [19]
Johnson et al.

[11] Patent Number: 5,996,376
[45] Date of Patent: Dec. 7, 1999

[54] METHODS OF FORMING OPTICAL RODS INCLUDING THREE-DIMENSIONAL PATTERNS ON END FACES THEREOF

[75] Inventors: Eric G. Johnson; Michael R. Feldman, both of Charlotte, N.C.

[73] Assignee: Digital Optics Corporation, Charlotte, N.C.

[21] Appl. No.: 08/991,803

[22] Filed: Dec. 16, 1997

Related U.S. Application Data

[60] Provisional application No. 60/043,285, Apr. 11, 1997.

[51] Int. Cl.⁶ .......................... C03B 37/15; C03C 25/02; C03C 25/04; C03C 17/00
[52] U.S. Cl. ................... 65/406; 65/408; 65/430; 65/445; 65/60.4
[58] Field of Search ................... 65/43, 60.1, 60.4, 65/111, 406, 408, 409, 412, 430, 443, 445

[56] References Cited

U.S. PATENT DOCUMENTS

| | | | |
|---|---|---|---|
| 4,198,117 | 4/1980 | Kobayashi | 350/96.19 |
| 4,698,084 | 10/1987 | Severijns et al. | 65/31 |
| 4,761,062 | 8/1988 | Loce et al. | 350/413 |
| 5,080,706 | 1/1992 | Snyder et al. | 65/102 |
| 5,155,631 | 10/1992 | Snyder et al. | 359/708 |
| 5,181,224 | 1/1993 | Snyder | 372/101 |
| 5,553,174 | 9/1996 | Snyder | 385/15 |
| 5,555,333 | 9/1996 | Kato | 385/89 |
| 5,566,262 | 10/1996 | Yamane et al. | 385/33 |
| 5,581,414 | 12/1996 | Snyder | 359/819 |
| 5,795,206 | 8/1998 | Cathey et al. | 445/24 |
| 5,815,624 | 9/1998 | Rosenberg | 385/115 |

FOREIGN PATENT DOCUMENTS

| | | | |
|---|---|---|---|
| 0256810 A2 | 2/1988 | European Pat. Off. | H04B 9/00 |
| 0 307 487 A1 | 3/1989 | European Pat. Off. | H02B 6/32 |
| 0465 230 A2 | 1/1992 | European Pat. Off. | G02B 7/00 |
| 0627641A1 | 12/1994 | European Pat. Off. | H02B 6/42 |
| 56159968 | 4/1983 | Japan | H01S 3/18 |
| 57130224 | 2/1984 | Japan | G02B 27/10 |
| 59252421 | 6/1986 | Japan | G02B 6/42 |
| 60193032 | 3/1987 | Japan | G11B 7/135 |
| 61-000728 | 7/1987 | Japan | G02B 5/18 |
| 61-054642 | 9/1987 | Japan | G02B 6/32 |
| 61176788 | 2/1988 | Japan | G02B 6/32 |
| 02056074 | 11/1991 | Japan | G09F 13/04 |
| 03238077 | 3/1993 | Japan | G01R 31/08 |
| WO93/15410 | 8/1993 | WIPO | G01R 15/07 |
| WO96/28750 | 9/1996 | WIPO | G02B 6/00 |

OTHER PUBLICATIONS

PCT International Search Report, International Application No. PCT/US98/06948.

Communication Relating to the Results of the Partial International Search, International Application No. PCT/US98/06933.

Thomas J. Suleski et al., *Miniaturizing And Packaging Diffractive Optics For Opto–Electronic Systems*, Lasers & Optronics, vol. 16, No. 9, Sep. 1997, pp. 35–36.

Thomas J. Suleski et al., *Miniaturizing and Packaging Diffractive Optics for Optoelectronic Systems*, Abstract, Lasers & Optronics, vol. 16, No. 9, Sep. 1997, pp. 35–36, 1997.

*Primary Examiner*—Stanley S Silverman
*Assistant Examiner*—Jacqueline A. Ruller
*Attorney, Agent, or Firm*—Jones Volentine, L.L.P.

[57] ABSTRACT

A method of patterning a plurality of optical rods includes bonding a plurality of optical rods into an array wherein each of the optical rods is aligned so that an exposed end face of each of the optical rods is oriented in a common direction. The exposed end faces of the optical rods are patterned so that each of the exposed end faces has a three-dimensional pattern formed thereon. These patterned optical rods can then be separated and used in the fabrication of optical systems.

60 Claims, 9 Drawing Sheets

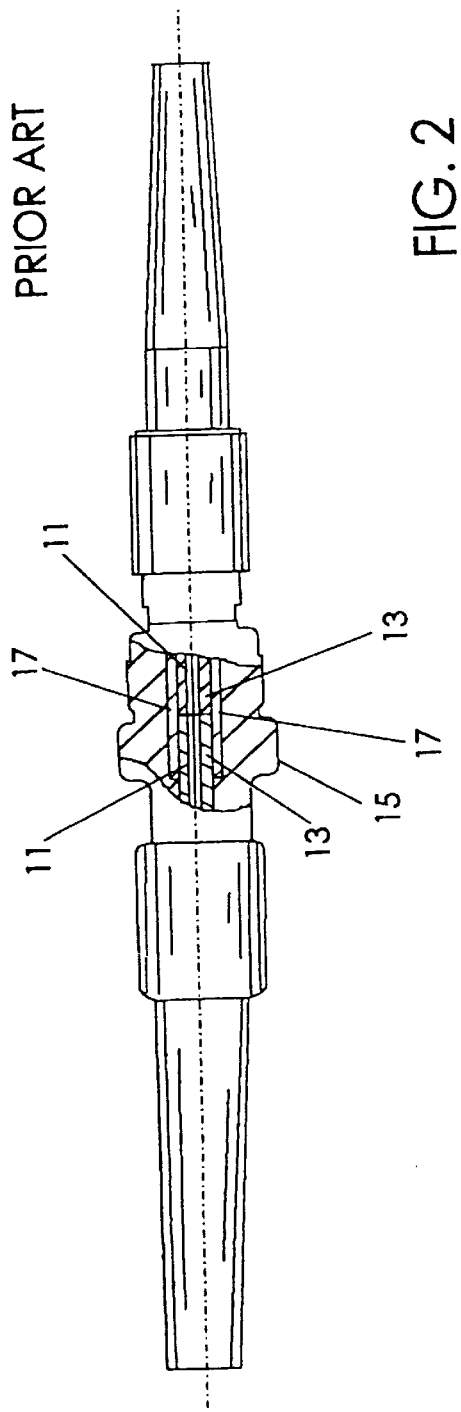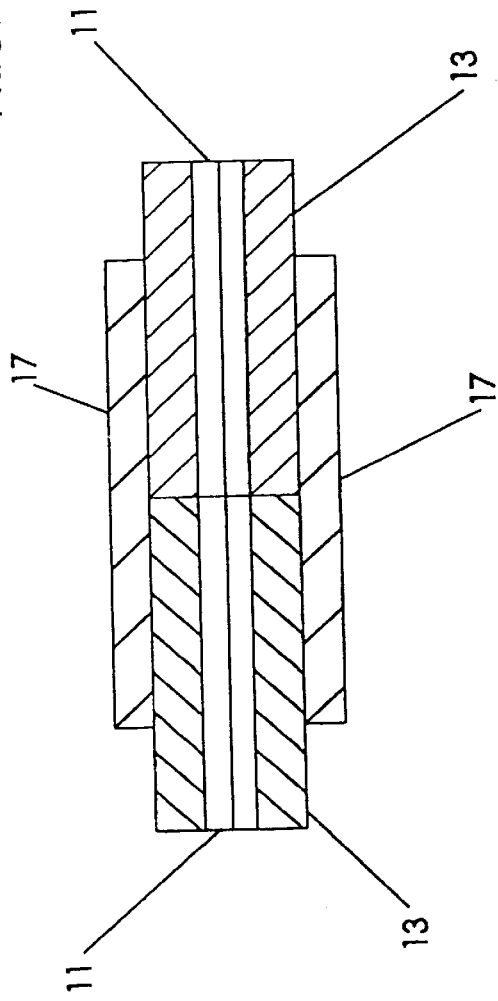

METHODS OF FORMING OPTICAL RODS INCLUDING THREE-DIMENSIONAL PATTERNS ON END FACES THEREOF

RELATED APPLICATIONS

The present application claims priority based on Provisional application Ser. No. 60/043,285, filed Apr. 11, 1997, entitled "Wafer Processing of Multiple Glass Rods For Incorporating Optical Elements On The Ends Thereof", the disclosure of which is hereby incorporated herein in its entirety by reference. The present application is also related to U.S. patent application Ser. No. 08/991,679 entitled "Optical Transmission Systems Including Optical Rods With Three-Dimensional Patterns Thereon And Related Structures" filed concurrently herewith (Attorney Docket No. 9020-4), the disclosure of which is hereby incorporated herein in its entirety by reference.

The U.S. Government may have rights to the present invention under government contract No. N00178-97-C-3058 issued by the Naval Surface Warfare Center.

FIELD OF THE INVENTION

The present invention relates to the field of optics and more particularly to methods of forming optical structures.

BACKGROUND OF THE INVENTION

Single mode fiber optic data links have been developed as alternatives to multimode fiber data links. In a single mode fiber, a single spatial mode propagates therethrough so that modal noise effects are reduced. Single mode optical systems, however, may be extremely sensitive to alignment errors. Sensitivity to alignment errors may be particularly critical when a data link is used in an extreme environment with exposure to vibrations and shock. A need thus exists to provide single mode fiber optic connections which have reduced sensitivity to shocks and vibrations. Dust and debris may also be problematic in single mode fiber connections known in the prior art.

A single mode fiber optic connection according to the prior art is illustrated in FIGS. 1 and 2. As shown, two single mode optical fibers 11 are inserted into ferrules 13 that are held together with a spring loaded stainless steel jacket 15. The springs keep the ferrules in compression in an attempt to keep the ferrules in contact at all times. A ceramic sleeve 17 surrounds the ferrules to keep the ferrules and the fibers aligned in the transverse direction. This sleeve is thus precisely machined to tolerances within 1 micron on the inner diameter. Accordingly, as light is transmitted from a first one of the fibers across the junction to the second fiber, residual losses may occur.

The ferrules, however, may piston in and out of the sleeve as a result of severe shocks and/or vibrations thereby creating a gap between the two fibers 11. This gap may increase optical losses beyond acceptable levels. Moreover, a single dust particle between the respective core portions of the two optical fibers may block a significant portion of the radiation being transmitted therebetween.

Gradient Index (GRIN) lenses have been used to collimate and focus light in fiber switching and connecting systems. GRIN lenses, however, may be quite large in comparison with the dimensions of optical fibers thus increasing overall package sizes and reducing switching densities. GRIN lenses may also be limited to simple optical focusing and collimation functions while current broadband networks may require complex functions for Wavelength Division Multiplexing (WDM).

Accordingly, there continues to exist a need in the art for improved methods and structures for joining two optical fibers to reduce optical losses for signals transmitted therebetween.

SUMMARY OF THE INVENTION

It is therefore an object of the present invention to provide methods of forming improved optic structures.

It is another object of the present invention to provide improved methods of forming optical beam shaping structures.

It is still another object of the present invention to provide methods of forming improved optical rods.

These and other objects are provided according to the present invention by methods including the steps of bonding a plurality of optical rods into an array wherein each of the optical rods is aligned, preferably in parallel, so that an exposed end face of each of the optical rods is oriented in a common direction. The exposed end faces of the optical rods are patterned so that each of the exposed faces has a three-dimensional pattern formed thereon. A large number of optical rods can thus be patterned simultaneously using photolithographic mask and etch steps. Moreover, the patterned optical rods can be separated from the array to provide a plurality of individual patterned optical rods. These individual optical rods can then be used in the fabrication of various fiber optic systems and micro-optic systems.

More particularly, each of the optical rods can be a glass rod, and the three-dimensional patterns can be diffractive optical patterns, refractive optical patterns, and/or patterned layers. These various optical patterns can be used to provide beam shaping functions, pattern generation functions, diffusion functions, collimating functions, focusing functions, and/or wavelength division multiplexing functions.

The plurality of optical rods can be bonded into a closely packed array using an epoxy. Alternately, a plurality of parallel grooves can be formed on the surface of a first substrate, the optical rods can be arranged in the grooves, and a second substrate can be bonded onto the surface of the first substrate so that the optical rods are in the parallel grooves between the first and second substrates. Moreover, the grooves can be V-grooves formed by etching a silicon substrate. According to another alternative, the plurality of optical rods are bonded into an array within an outer cylinder. In either case, one end of each of the plurality of optical rods can be simultaneously patterned.

The step of bonding the plurality of optical rods can include the steps of bonding a plurality of optical fibers into an array and cutting the array of optical fibers along a direction perpendicular to the axis of each of the optical fibers thereby exposing the end faces of each of the optical rods. Accordingly, a plurality of arrays of optical rods can be cut from a single array of optical fibers. Moreover, optical rod arrays cut from approximately the same portion of the optical fiber array will have substantially the same orientation of optical rod faces. A common mask set can thus be used to pattern multiple arrays of optical rods cut from adjacent portions of the original fiber array.

The methods of the present invention can thus be used to provide a plurality of patterned optical rods each having a width (or diameter) of 1 mm or less and a length of 6 mm or less. Accordingly, the methods of the present invention can be used to pattern GRIN lenses having widths (or diameters), for example, of 500 microns or 250 microns, and to pattern glass rods having diameters of 125 microns which would be dimensionally compatible with the conventional optical fibers. These precisely patterned micro-optical rods can thus be used in the fabrication of fiber optic and micro-optic systems. More particularly, diffractive patterns, refractive patterns, and reflective patterns can be provided on end faces of the micro-optic rods of the present invention.

BRIEF DESCRIPTION OF THE DRAWINGS

FIG. 1 is a cross sectional view of an fiber optic connector according to the prior art.

FIG. 2 is a greatly enlarged cross sectional view of the sleeve, ferrules, and optical fibers of FIG. 1.

FIG. 3b is an enlarged cross sectional view of a glass rod of FIG. 3a.

FIG. 9b is a photolithographic mask formed using the system of FIG. 9a.

DETAILED DESCRIPTION

Figure 3A:
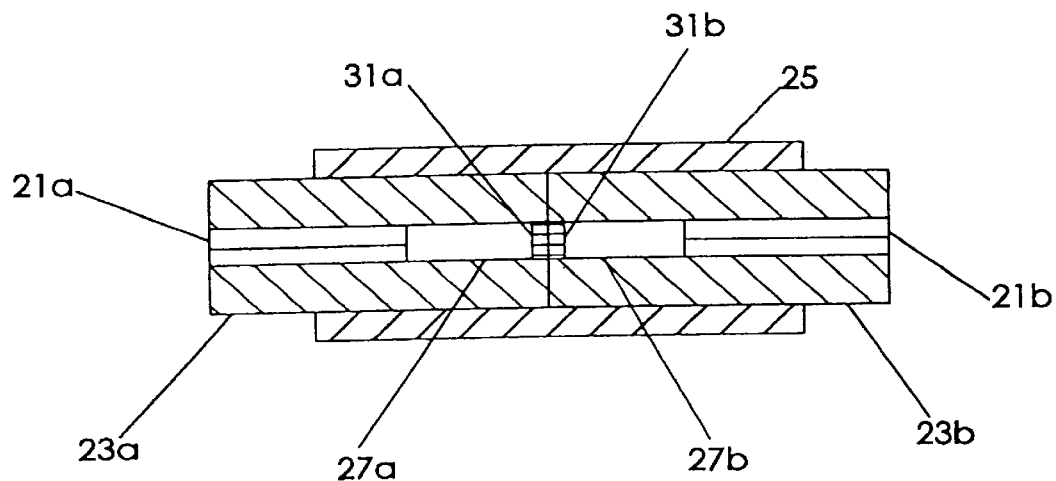
FIG. 3a is a cross sectional view of an expanded beam fiber optic connector including a glass rod formed according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the dimensions of elements are exaggerated for clarity. Like numbers refer to like elements throughout. It will also be understood that when an element is referred to as being "on" another element, it can be directly on the other element, or intervening elements may also be present.

Figure 3B:
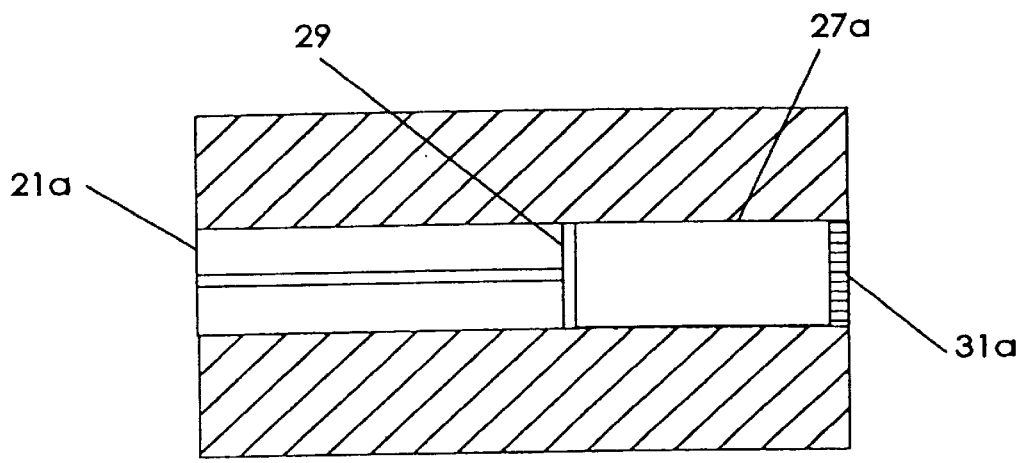

An optical fiber connector including an optical rod formed according to the present invention is illustrated in FIGS. 3a and 3b. As shown, two optical fibers 21a and 21b are inserted into respective ferrules 23a and 23b which are aligned within the sleeve 25 as before. In addition, the glass rods 27a and 27b are provided at the ends of the respective optical fibers within the ferrules. As shown in FIG. 3b, an epoxy 29 can be used to bond the glass rod 27a to the end of the optical fiber 21a, and a three dimensional pattern 31a can be provided on the end of the glass rod 27a opposite the optical fiber 21a. In particular, the three-dimensional pattern 31a can be used to provide a diffractive lens or a refractive lens on the end of the glass rod. Similarly, an epoxy can be used to bond the optical fiber 21b and the glass rod 27b, and a three-dimensional pattern 31b can be provided on the end of the glass rod 27b opposite the optical fiber 21b.

Figure 4:
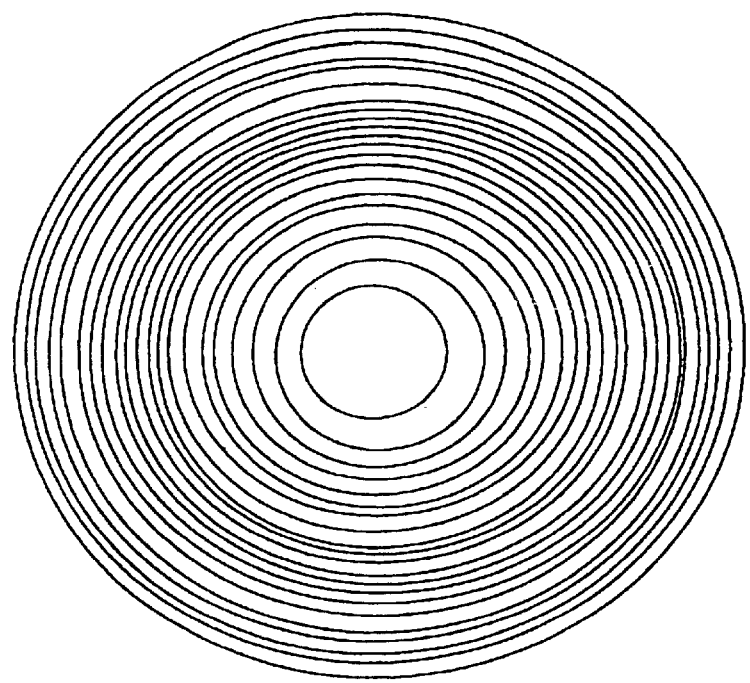
FIG. 4 is an photograph of a patterned end of a glass rod formed according to the present invention.

The glass rods 27a and 27b can each be provided with a diffractive lens as discussed above to reduce optical losses for light transmitted between the two optical fibers 21a and 21b. The operation of the glass rods will now be discussed with reference to FIG. 3a for light being transmitted from the first optical fiber 21a to the second optical fiber 21b. Light is generally transmitted through the central core region of an optical fiber. Accordingly, light transmitted through the first optical fiber 21a will expand as it passes through the glass rod 27a which has a uniform index of refraction across its diameter. The diffractive lens 31a can thus be used to collimate the expanded beam. The diffractive lens 31b on the second glass rod 27b can then be used to focus the expanded and collimated beam into the core of the second optical fiber 21b. The end face of a glass rod with a diffractive lens patterned thereon is illustrated in FIG. 4. In particular, the diffractive lens of FIG. 4 is an eight phase-level diffractive pattern etched onto a 125 micron diameter glass rod. This micro-optical rod can thus fit snugly into a standard ferrule to provide an expanded beam optical fiber connection having coupling efficiencies with losses of less than 1 dB and having a high degree of collimation.

Figure 5:
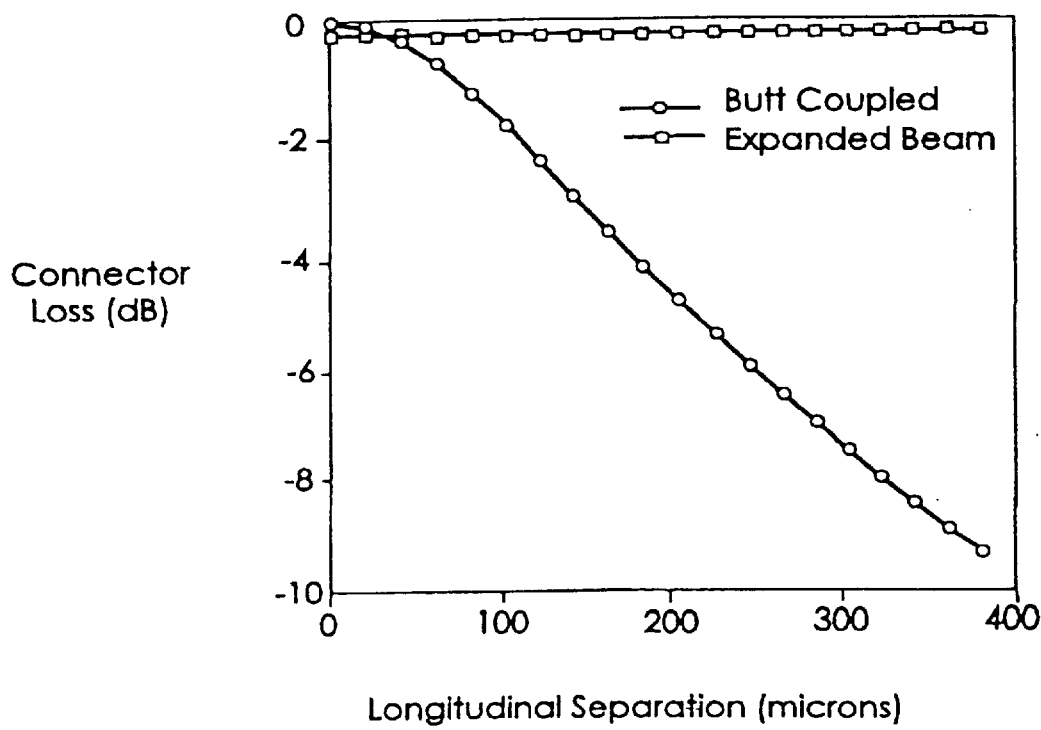
FIG. 5 is a graph illustrating connector losses as a function of longitudinal separation for a butt coupled fiber optic connector (circles) according to the prior art and for an expanded beam fiber optic connector (squares) including glass rods formed according to the present invention.

The sensitivity to vibrations and shocks can thus be reduced so that the expanded and collimated beam can traverse varying gaps between the glass rods with reduced optical losses. As shown in FIG. 5, the optical losses with respect to displacement are relatively invariant for expanded beam connectors. As further shown in FIG. 5, the optical losses increase rapidly with increasing displacements in conventional connectors. In other words, the performance of the conventional connector degrades rapidly as a function of separation distance. Furthermore, a single dust particle between the two optical rods may block only a small portion of the expanded beam of light transmitted therebetween thus reducing the losses due to dust.

Diffractive lenses can be used instead of the refractive ball lenses of the prior art. Diffractive lenses have the advantages of reduced birefringence and/or aberration effects because diffractive lenses can provide nearly perfect lens functions when patterned onto the rods.

A method of mass producing optical rods including the patterned end faces according to the present invention will now be discussed with reference to FIGS. 6–9. As an example, a plurality of optical fibers such as glass fibers each having a diameter of approximately 125 microns can be arranged into a closely packed array and bonded with an epoxy which can be UV cured or thermally cured. The array of fibers can then be diced (or cut) into a plurality of wafers wherein each wafer has a thickness of approximately 1 mm. Accordingly, each of the wafers can include a plurality of glass rods aligned in parallel and bonded together with the epoxy wherein each glass rod has a diameter of approximately 125 microns and a length of approximately 1 mm. Each wafer thus has two opposing faces, and one end face of each of the glass rods is exposed at each wafer face so that one end face of each of the glass rods can be patterned with a three-dimensional pattern simultaneously. The epoxy can then be chemically dissolved thereby separating each of the patterned glass rods for assembly into fiber optic connectors or other optical applications.

Figure 6:
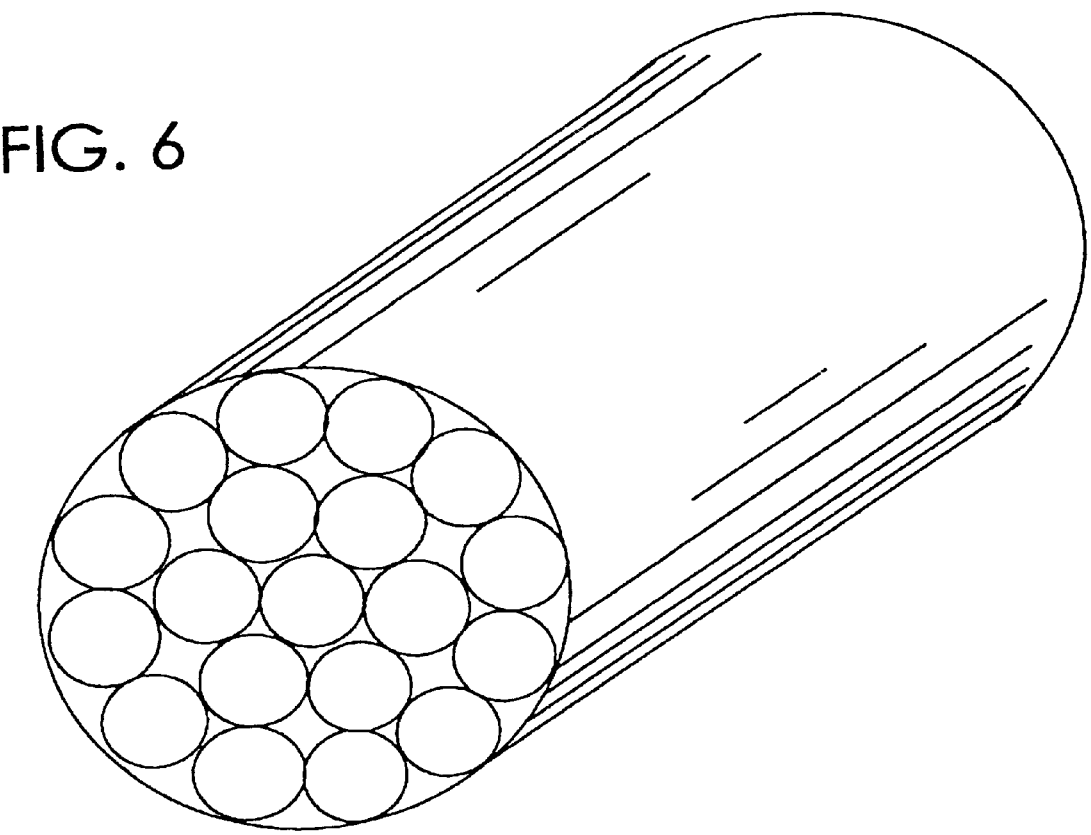
FIG. 6 is an end view of a bonded fiber array formed according to the present invention.

As shown in FIG. 6, nineteen closely packed optical fibers can be surrounded by a glass sleeve and bonded with an epoxy. Much larger arrays of fibers having on the order of 1,000 to 20,000 fibers can also be provided. Accordingly, a wafer diced from an array will have a number of optical rods corresponding to the number of optical fibers in the parent fiber array. The nineteen fiber array illustrated in FIG. 6 has been found to be repeatable, but packing errors on the order of 5 microns to 10 microns may occur. The Applicants theorize that the packing arrangement is a function of the boundary into which the fibers are inserted.

By providing a large number of optical rods in a single wafer, the large number of optical rods can be patterned simultaneously using photolithographic techniques developed in the microelectronics industry. As an example, an array of thousands of 125 micron low OH glass fibers can be bonded together using a UV cured epoxy. This array of fibers can then be diced (or cut) to provide a plurality of 1 mm thick wafers with thousands of optical rods per wafer. At least one face of each of these wafers is then optically polished to facilitate photolithographic patterning. This polishing step is preferably performed so that the formation of micro-fractures in the optical rods is reduced. In particular, a double lapping polisher can be used. Accordingly, each of the optical rod end faces making up the polished wafer face lie in a common plane so that each of the polished end faces can be photolithographically patterned simultaneously.

Figure 7:
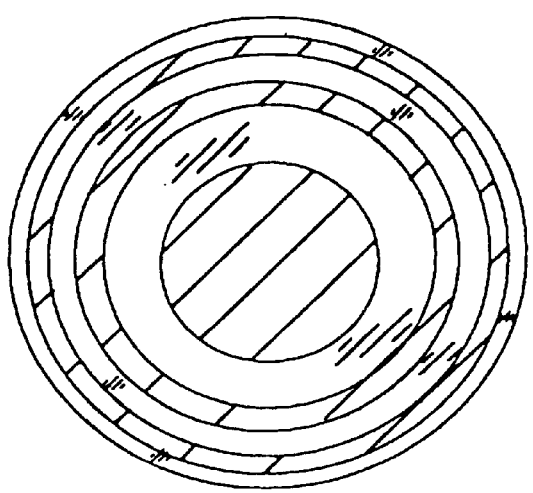
FIG. 7 is a mask pattern used to form a diffractive pattern on a glass rod according to the present invention.

In particular, one or more photolithographic mask and etching steps can be used to form diffractive patterns having one or more steps (two or more levels) in the exposed end faces of each of the optical rods. The formation of diffractive patterns is discussed for example in U.S. Pat. No. 5,218,471 entitled "High-Efficiency, Multi-Level, Diffractive Optical Elements" to Swanson et al., the disclosure of which is hereby incorporated herein in its entirety by reference. The formation of a multi-level diffractive pattern will now be briefly discussed with reference to FIGS. 7 and 8A–8H. In particular, FIG. 7 illustrates a typical mask pattern used when forming a diffractive pattern on an end face of an optical rod. Multiple masks can be used to create diffractive patterns having up to $2^n$ levels where n is the number of masks.

Figure 8A:
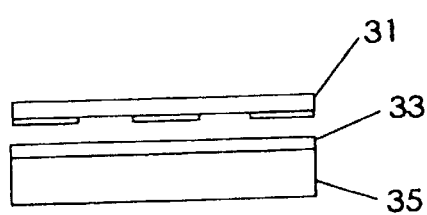
FIGS. 8a–8f are cross sectional views illustrating steps used to form a diffractive pattern on a glass rod according to the present invention.
Figure 8D:
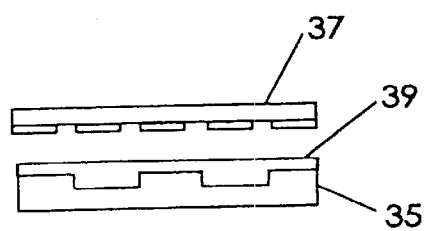
Figure 8B:
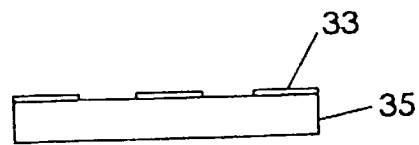
Figure 8E:
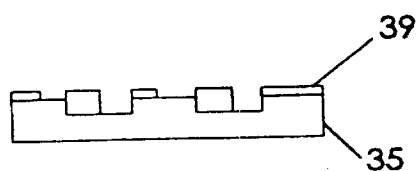
Figure 8C:
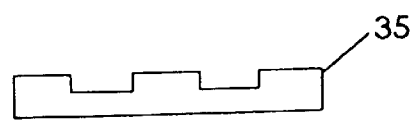
Figure 8F:

The use of two masks to create a four level diffractive pattern is illustrated in FIGS. 8A–8F. A first mask 31 is used to pattern a first photoresist layer 33 on an end face 35 of an optical rod as shown in FIGS. 8A and 8B. The patterned photoresist layer 33 is used as an etch mask during a reactive ion etch to produce steps in the face 35 of the optical rod, and the first patterned photoresist layer is then removed as shown in FIG. 8C. A second mask 37 is then used to pattern a second photoresist layer 39 as shown in FIGS. 8D and 8E. The second patterned photoresist layer 39 is then used as an etch mask during a second reactive ion etch to produce two additional steps in the face 35, and the second patterned photoresist layer is then removed as shown in FIG. 8F. Accordingly, stepped diffractive patterns can be formed with the resolution being determined by the number of mask and etch steps used. The height of each step can be controlled by controlling the duration of the respective reactive ion etch.

In order to simultaneously pattern each of the exposed end faces of the optical rods in a wafer, each photomask should include a separate masking pattern corresponding to each of the optical rod end faces, and these separate masking patterns should be precisely arranged to correspond to the arrangement of the end faces within a wafer. Because the arrangement of the optical rods may differ from wafer to wafer as a result of packing errors, different photomask sets may be needed for different wafers. In other words, a custom mask set may be needed for a particular wafer of optical rods. Because wafers cut from adjacent portions of a fiber array may have a substantially identical arrangement of optical rods, a custom mask set can be used for as many as ten to twenty wafers diced from a single optical fiber array. Accordingly, a custom mask set used to pattern ten to twenty wafers with 10,000 to 20,000 optical rods per wafer can yield as many as 150,000 or more patterned optical rods. The production of custom mask sets can thus be justified economically.

Figure 9A:
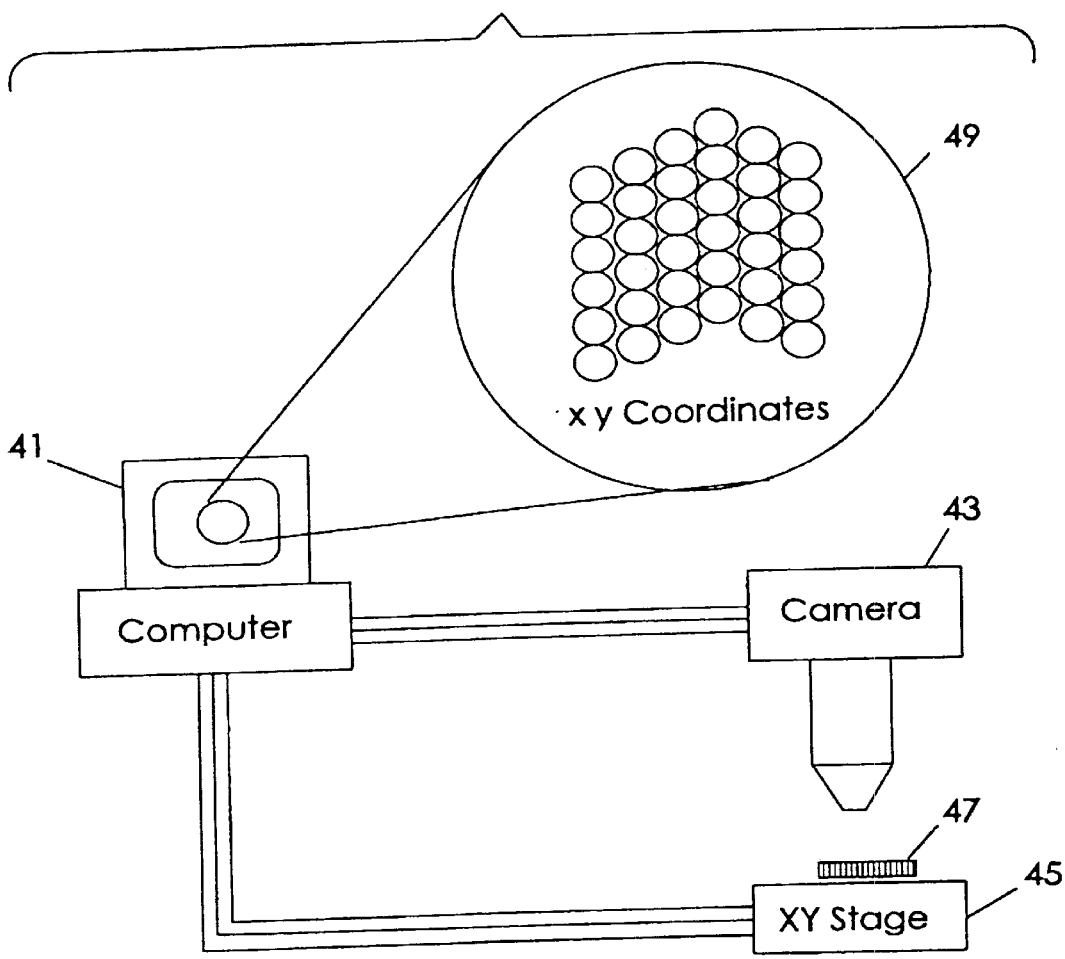
FIG. 9a is a block diagram of a system used to generate photolithographic masks for a wafer of bonded optical rods according to the present invention.

A custom mask set can be generated using an E-beam writing technique. In particular, the arrangement of individual patterns on each mask in the set should be determined to correspond to the arrangement of the optical rod faces to be patterned. An automated system for determining the locations of each of the optical rod end faces on a wafer of optical rods is illustrated in FIG. 9a. This system includes a computer 41, a camera 43, and a stage 45 for analyzing a wafer 47 of optical rods. By scanning the wafer 47 with the camera 43 and providing the information to the computer 41, the x–y coordinates 49 of the center points of each of the optical rod end faces can be determined within micron positional tolerances using the optical instrumentation together with pattern recognition and data processing techniques. In other words, pattern recognition techniques are used to locate the centers of the individual optical rod faces as the camera is scanned across the wafer on a micro-stage.

Figure 9B:
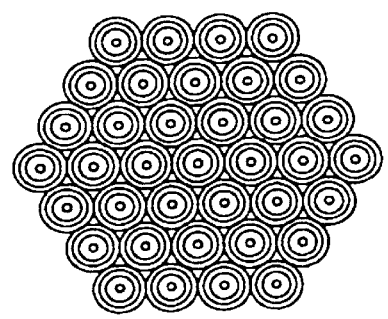

The x–y coordinates are then used to generate the custom mask set. In particular, a data file including the x–y coordinates locating the center points of the optical rod end faces can be electronically transferred to mask generation equipment used to form E-beam written masks. The mask generation equipment uses the x–y coordinates to layout each mask in the set wherein each mask includes a plurality of identical mask patterns centered about the designated x–y coordinates to correspond to the locations of the optical rod end faces. This step is also known as data fracturing. An E-beam is then used to direct write to a photoresist layer on a mask blank, and the patterned photoresist layer is used as an etch mask to pattern the mask blank. This procedure is repeated for each mask in the set. An example of a mask thus formed is illustrated in FIG. 9b. While the mask of FIG. 9b includes 37 mask patterns, it will be understood that these principles can be used to fabricate custom masks including tens of thousands of mask patterns corresponding to tens of thousands of optical rod end faces in a wafer.

The individual optical rod end faces in the wafer are then patterned using the custom mask set discussed above. In particular, a photoresist layer is spun on the wafer covering the optical rod end faces. This photoresist layer is then exposed and developed using the first mask from the custom mask set wherein individual mask patterns from the first mask are aligned with individual rod end faces. Portions of the rod end faces exposed by the patterned photoresist layer are etched using a timed reactive ion etch to provide a two level stepped structure. Additional steps and/or levels can be added to the structure by adding additional mask and etch steps to provide diffractive lenses having higher levels of resolution. Diffractive patterns can thus be used advantageously in narrow band communication networks.

Figure 10A:
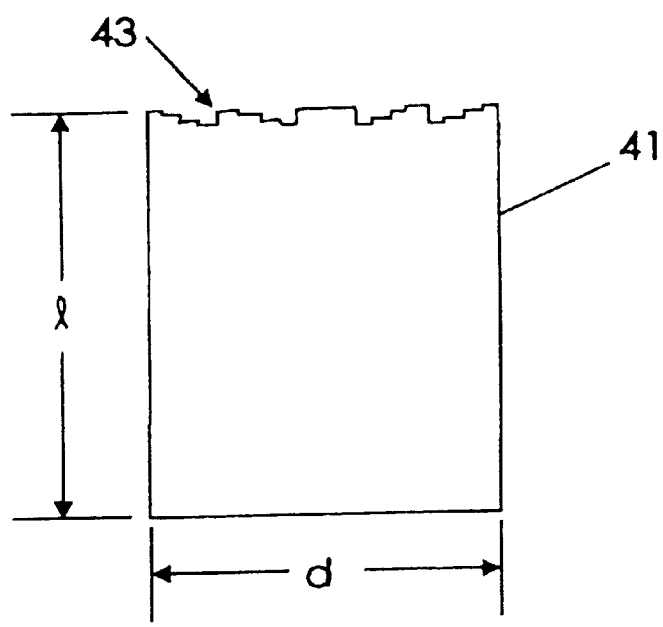
FIG. 10a is a cross-sectional view of an optical rod including a diffractive pattern formed according to the present invention.

As shown in FIG. 10a, an optical rod 51 having a length I and a diameter d can be formed having a three-dimensional diffractive (stepped) pattern 52 on an end thereof. The optical rod can have a cylindrical shape, a length I of approximately 6 mm or less, and a diameter d of approximately 1 mm or less which would have been difficult to produce using prior art techniques. More particularly, the optical rod can be a GRIN lens having a diameter, for example, of 250 microns or 500 microns, or a glass rod having a diameter of 125 microns which would be dimensionally compatible with conventional optical fibers.

Figure 10B:
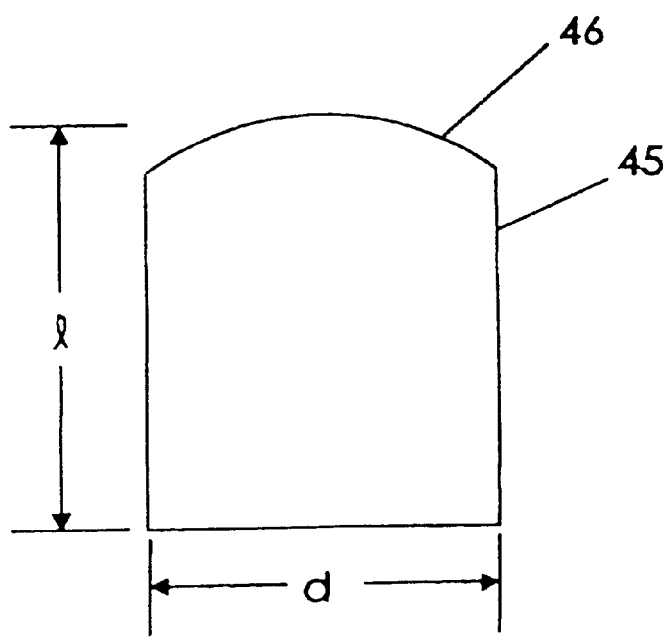
FIG. 10b is a cross-sectional view of an optical rod including a refractive pattern formed according to the present invention.

Alternately, refractive lenses can be provided on the rod end faces by patterning the photoresist layer so that a circular photoresist pattern covers each of the rod end faces, and reflowing the circular photoresist patterns so that the photoresist tapers off at the edges of each of the rod end faces. A reactive ion etch then etches through the tapered photoresist pattern so that the edges of the rod end faces with thinner photoresist thereon are etched for a longer time than central portions of the rod faces with thicker photoresist thereon. Accordingly, a rounded rod end face can be provided on each of the rods thereby providing a refractive lens. The individual circular mask patterns can be laid out on the mask using the steps discussed above with regard to the FIG. 9. Refractive lenses can be used advantageously to focus a broad range of optical wavelengths in broadband networks which operate at two or more multiplexed wavebands. As shown in FIG. 10b, the optical rod 54 can have a refractive (rounded) pattern 55 on an end thereof. Alternately, the rounded resist can provide the lens without etching. Other methods of forming refractive lenses are discussed in Provisional patent application Ser. No. 60/041,042 entitled "Gray Mask Made of Absorptive Materials and for Fabricating Optical Elements Using a Photoresist Formed From Contact Printing of a Gray Mask" to Feldman et al. and filed Mar. 21, 1997. The disclosure of this Provisional Application is hereby incorporated herein in its entirety by reference.

Figure 10C:
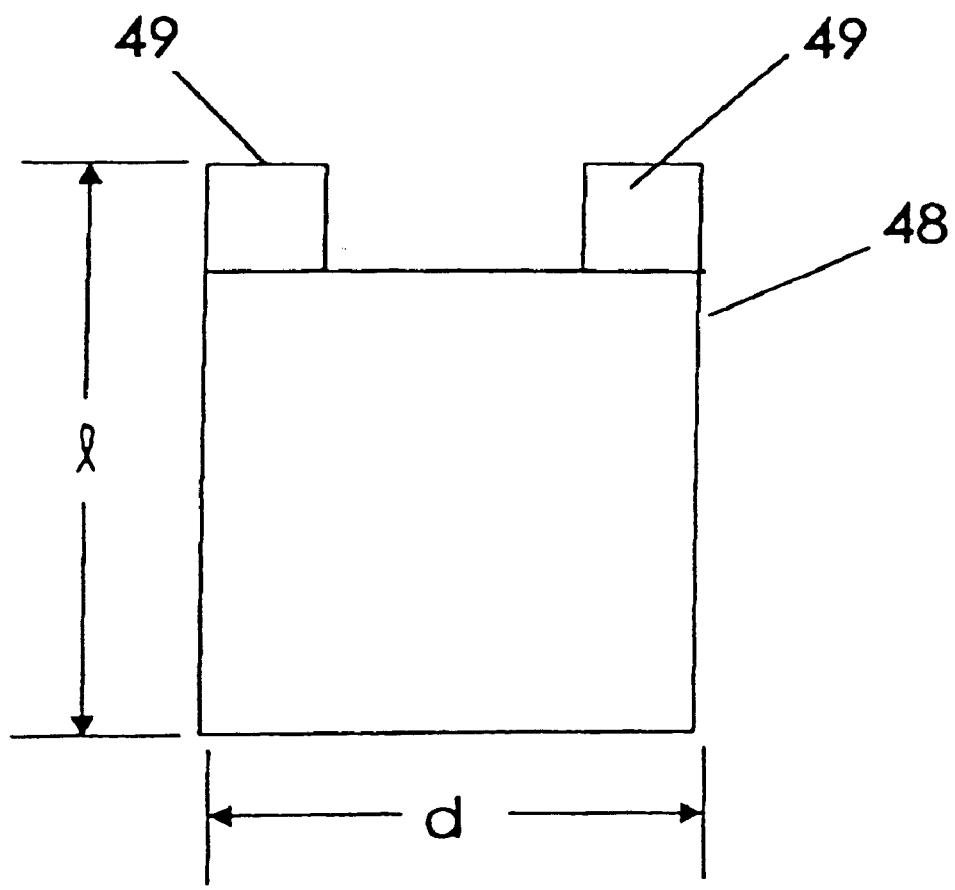
FIG. 10c is a cross-sectional view of an optical rod including a pattern formed according to the present invention.

According to another alternative, the wafer end face can be covered with a layer of another material such as a highly reflective dielectric material or metal, and this reflective layer can be patterned to provide a multi-level structure on each of the rod end faces. For example, a patterned dielectric layer on a rod end face can be used to provide a partial reflector. As shown in FIG. 10c, an optical rod 57 can have a patterned reflective layer 58 on an end thereof covering portions of the end and exposing portions of the end.

Once the rod end faces have been patterned, the epoxy bonding the optical rods together can be dissolved to provide a plurality of individual patterned glass rods. An optical rod end face including a diffractive pattern thereon is shown in FIG. 4. Using the methods discussed above, tens of thousands of optical rods can be patterned simultaneously so that individual structures can be fabricated cost effectively. While the optical rods have been discussed for use in fiber optic connectors, these optical rods can have many other uses. Alternate uses for these optical rods are discussed, for example, in copending patent application Ser. No. 08/991,679 filed concurrently herewith and entitled "Optical Transmission Systems Including Optical Rods With Three-Dimensional Patterns Thereon And Related Structures" (Attorney Docket No. 9020-4). The disclosure of this application is hereby incorporated herein in its entirety by reference.

Figure 11:
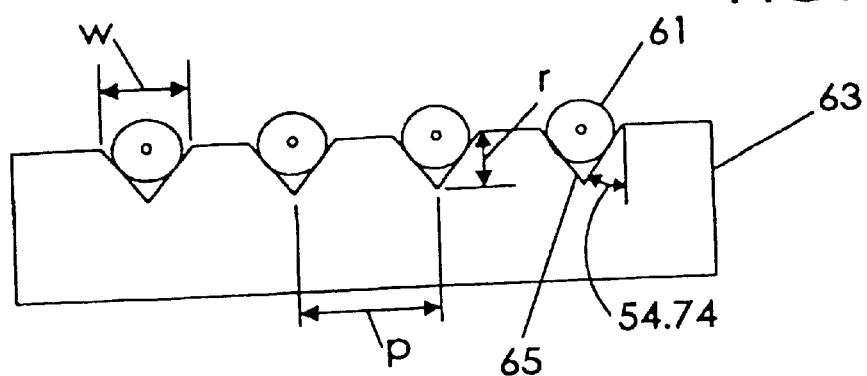
FIG. 11 is a cross sectional view illustrating an array of optical fibers arranged in V-grooves formed according to the present invention.

As discussed above, the fiber arrays can be formed by packing and bonding individual fibers into sleeves. The fiber arrays can alternately be formed as discussed below with regard to FIGS. 11–13. Individual optical fibers 61 can be arranged into an array of parallel optical fibers using a silicon substrate 63 with V-grooves 65 in a face thereof as shown in FIG. 11. The use of V-grooves has the advantage that predictable positioning and alignment of the fibers can be provided within tight tolerances. The V-grooves are formed using the preferential etching characteristics of a <100> oriented silicon substrate. In particular, the etch anisotropy between the <100> and <111> planes is on the order of 400:1 so that when a portion of the substrate is etched using a solution such as KOH, a V-groove is produced.

The period P of the V-grooves across the surface of the substrate can be controlled within a micron using known photolithography techniques. The etch depth r can be controlled to within +/−1 micron. Overall, the pattern tolerance can be controlled to within 1 micron positional accuracy. The glass fibers can then be bonded into the V-grooves using an epoxy which can be UV cured or thermally cured. The resulting structure is then diced (or cut) along a direction perpendicular to the glass fibers to provide glass rods bonded in V-grooves. The exposed end faces of the glass rods can then be patterned and removed from the silicon as discussed above. Because the positioning of the glass fibers (and thus the glass rods) can be so accurately controlled, the need for custom masks can be reduced. In other words, arrays of glass rods can be formed without the need to provide custom mask sets thereby reducing the tooling costs.

Figure 12A:
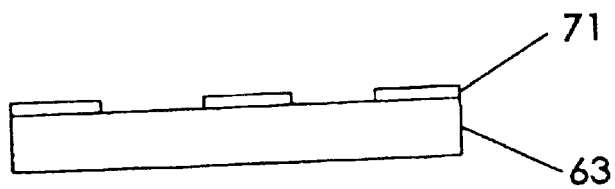
FIGS. 12a and 12b are cross sectional views illustrating steps used to form V-grooves in a substrate according to FIG. 11.
Figure 12B:
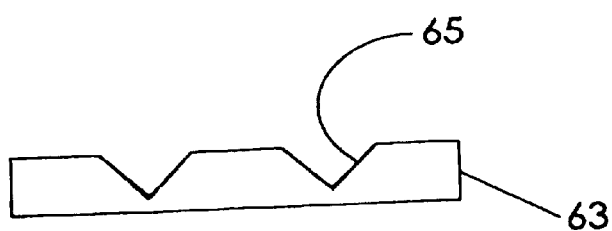

Steps in the formation of the V-grooves are illustrated in FIGS. 12a and 12b. As shown in FIG. 12a, a silicon nitride mask layer 71 is formed on a <100> oriented silicon substrate 63. The exposed portions of the silicon substrate are then etched to provide the V-grooves and the silicon nitride mask layer is removed as shown in FIG. 12b. In particular, the substrate can be etched using a 45% KOH solution at 65° C.

Figure 13:
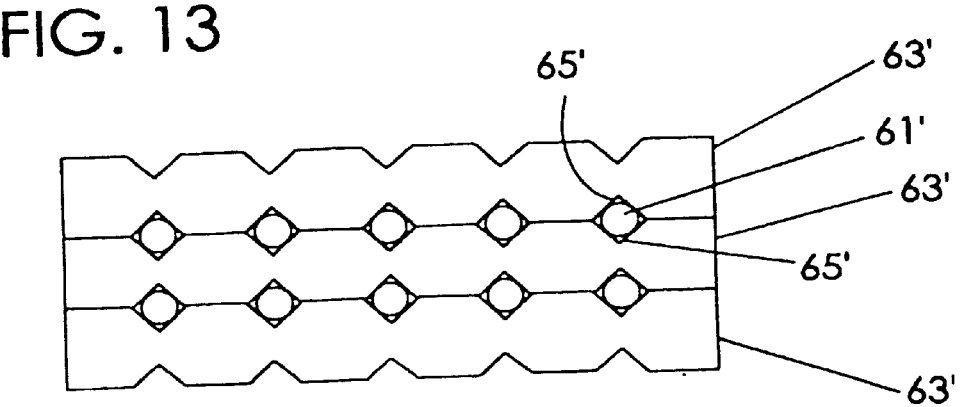
FIG. 13 is a cross sectional view illustrating a stacked array of substrates including V-grooves and optical fibers formed according to the present invention.

Furthermore, substrates 63' with optical fibers 61' bonded into V-grooves 65' therein can be stacked and bonded with an epoxy, such as a thermal curing epoxy or a UV curing epoxy, as shown in FIG. 13. In particular, V-grooves can be etched into opposing faces of the substrates so that V-grooves on adjacent substrates form channels through which the optical fibers extend. The stacked structure can then be diced (or cut) along a direction perpendicular to the fibers to provide a plurality of wafers with each wafer including an array of optical rods with end faces thereof exposed. These end faces can be polished and patterned simultaneously as discussed above, and the bonding agent chemically dissolved to separate the individual patterned optical rods. Because the optical rods can be arranged with tight positioning tolerances, the need for custom masks can be reduced. Yields can thus be increased and costs can be reduced.

The optical rods formed according to the present invention can be formed from glass fibers having a uniform index of refraction along a cross section thereof. Accordingly, the resulting rod will have a uniform index of refraction. Alternately, a rod can be formed having a gradient index of refraction along a cross section thereof to provide a gradient index (GRIN) lens. By providing a diffractive pattern on the end of the GRIN lens, shifts in the focal length of the GRIN lens resulting from temperature changes can be reduced. In other words, athermalization of the GRIN lens is provided. As before, a plurality of GRIN optical rods can be bonded in a wafer, simultaneously patterned, and then separated.

As discussed above, optical fibers having widths (or diameters) of approximately 125 microns can be bonded into an array and cut into wafers. The ends of the rods in a wafer can be patterned simultaneously and the rods separated to provide a plurality of patterned optical rods. The use of 125 micron optical fibers has the advantage that the resulting rods are dimensionally compatible with single mode optical fibers as discussed with regard to FIGS. 3a and 3b. The methods of the present invention, however, can be used to pattern the ends of rods having much larger dimensions that would have been otherwise difficult or inefficient to pattern using techniques according to the prior art.

For example, wafers of rods can be formed and patterned by the methods of the present invention wherein each rod has a width (or diameter) of approximately 1 mm and a length of approximately 6 mm. Such a rod would have been difficult to pattern efficiently according to the prior art. In addition, the methods of the present invention can be used to pattern wafers of GRIN lenses wherein each GRIN lens has a width (or diameter), for example, of 250 microns or 500 microns. Moreover, the fibers and rods have been discussed as being cylindrical with a circular cross-section. Alternately, the fibers and the rods can have either cross-sections such as rectangular, hexagonal, or elliptical.

In addition, the methods of the present invention can be used to pattern both ends of an optical rod. For example, a wafer of optical rods can be patterned on a first side and then patterned on a second side so that both ends of each of the rods in the wafer are patterned. Double patterned optical rods could be used, for example, in the optical fiber connector of FIGS. 3a and 3b so that either end of each optical rod can be aligned next to the respective optical fiber. Because of the relative dimensions of the fiber core and the patterned end of the rod adjacent the fiber, the second pattern adjacent the fiber could have an insignificant effect on radiation entering the first rod from the first fiber or on radiation exiting the second rod into the second fiber. Accordingly, the need to assemble the rods in one direction or the other can be reduced. Alternately, double patterned rods can be used to provide optical processing at each end thereof.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of patterning a plurality of optical rods, said method comprising:

arranging a plurality of optical rods into an array wherein each of the optical rods is aligned so that an exposed end face of each of said optical rods is oriented in a common direction; and patterning said exposed end faces of said optical rods in said array so that said exposed end faces have a three-dimensional pattern serving an optical function formed thereon, said patterning including generating a photolithography mask including a plurality of patterns corresponding to said plurality of exposed end faces;

forming a photoresist layer on said plurality of exposed end faces;

transferring said plurality of patterns from said photolithography mask to said photoresist layer; and selectively performing at least one of adding material to and subtracting material from said end faces in accordance with said plurality of patterns in said photoresist layer to thereby form said three-dimensional pattern serving an optical function.

2. A method according to claim 1 wherein each of said optical rods comprises a glass rod.

3. A method according to claim 1 wherein each of said three-dimensional patterns comprises a diffractive optical pattern so that each of said end faces has a stepped profile.

4. A method according to claim 1 wherein each of said three-dimensional patterns comprises a refractive optical pattern.

5. A method according to claim 1 wherein each of said three-dimensional patterns comprises a patterned layer so that a portion of each of said end faces is covered by said respective patterned layer and so that a portion of each of said end faces is exposed.

6. A method according to claim 5 wherein said patterned layer comprises a material chosen from the group consisting of a metal and a dielectric.

7. A method according to claim 1 wherein said bonding step comprises bonding said plurality of optical rods into a closely packed array with an epoxy.

8. A method according to claim 1 wherein said bonding step comprises the steps of:

forming a plurality of parallel grooves on a surface of a first substrate;

arranging said plurality of optical rods in said parallel grooves; and bonding a second substrate on said surface of said first substrate so that said plurality of optical rods are in said parallel grooves between said first and second substrates.

9. A method according to claim 8 wherein said grooves comprise V-grooves.

10. A method according to claim 1 wherein said bonding step comprises bonding said plurality of optical rods into an array within an outer cylinder.

11. A method according to claim 1 wherein said patterning step is preceded by the step of:

polishing said plurality of said exposed end faces of said optical rods in said array.

12. A method according to claim 1 wherein said bonding step comprises the steps of:

bonding a plurality of optical fibers into an array; and cutting said array of optical fibers along a direction perpendicular to said axis of each of said optical fibers thereby exposing said end faces of each of said optical rods.

13. A method according to claim 1 wherein said patterning step is followed by the step of:

separating said plurality of optical rods.

14. A method according to claim 13 further comprising the step of:

optically coupling a radiation source to one of said optical rods.

15. A method according to claim 1 wherein said selectively performing comprises:
  etching portions of said end faces exposed through said photoresist layer serving as an etch mask.

16. A method according to claim 1 wherein said generating step comprises the steps of:
  determining locations for each of said exposed end faces; and
  laying out said plurality of patterns on said photolithography mask using said locations.

17. A method according to claim 1 wherein each of said optical rods has a uniform index of refraction along a cross section thereof.

18. A method according to claim 1 wherein each of said optical rods has a gradient index of refraction along a cross section thereof.

19. A method according to claim 1 wherein each of said optical rods has a width of approximately 1 mm or less and a length of approximately 6 mm or less.

20. A method according to claim 1 wherein each of said optical rods has a diameter of approximately 500 microns or less.

21. A method of forming a plurality of optical rods comprising:
  arranging a plurality of optical rods into an array;
  cutting said array of optical rods along a direction perpendicular to said axis of each of said optical rods thereby providing a plurality of wafers so that each of said wafers includes an array of optical rods wherein each of said optical rods in each of said wafers is oriented in a common direction;
  patterning said exposed end faces of said optical rods in said array so that said exposed end faces have a three-dimensional pattern; and
  separating said plurality of optical rods into independent individual optical rods.

22. A method according to claim 21 wherein each of said optical fibers comprises a glass fiber and wherein each of said optical rods comprises a glass rod.

23. A method according to claim 21 wherein said arranging step comprises arranging said plurality of optical fibers into a closely packed array with an epoxy.

24. A method according to claim 21 wherein said arranging step comprises the steps of:
  forming a plurality of parallel grooves on a surface of a first substrate;
  arranging said plurality of optical fibers in said parallel grooves; and
  bonding a second substrate on said surface of said first substrate so that said plurality of optical fibers are in said parallel grooves between said first and second substrates.

25. A method according to claim 24 wherein said grooves comprise V-grooves.

26. A method according to claim 21 wherein said arranging step comprises arranging said plurality of optical fibers into an array within an outer cylinder.

27. A method according to claim 21 further comprising the step of:
  separating said plurality of optical rods in said wafer.

28. A method according to claim 27 further comprising the step of:
  optically coupling a radiation source to one of said optical rods.

29. A method according to claim 21 further comprising the step of:
  simultaneously patterning said exposed end faces of said optical rods in one of said wafers so that each of said exposed end faces of said wafer has a three-dimensional pattern thereon.

30. A method according to claim 29 wherein each of said three-dimensional patterns comprises a diffractive optical patterns so that each of said end faces has a stepped profile.

31. A method according to claim 29 wherein each of said three-dimensional patterns comprises a refractive optical pattern.

32. A method according to claim 29 wherein each of said three-dimensional patterns comprises a patterned layer so that a portion of each of said end faces is covered by said respective patterned layer and so that a portion of each of said end faces is exposed.

33. A method according to claim 32 wherein said patterned layer comprises a material chosen from the group consisting of a metal and a dielectric.

34. A method according to claim 29 wherein said patterning step is preceded by the step of:
  polishing said plurality of said exposed end faces of said optical rods in said wafer.

35. A method according to claim 29 wherein said patterning step comprises the steps of:
  generating a photolithography mask including a plurality of patterns corresponding to each of said exposed end faces of said wafer;
  forming a photoresist layer on said plurality of exposed end faces of said wafer;
  transferring said plurality of patterns from said photolithography mask to said photoresist layer thereby forming an etch mask on said plurality of exposed end faces of said wafer; and
  etching portions of said end faces of said wafer exposed through said etch mask.

36. A method according to claim 35 further comprising the steps of:
  forming a second photoresist layer on a second plurality of exposed end faces of a second one of said wafers cut from said array of fibers;
  transferring said plurality of patterns from said photolithography mask to said second photoresist layer thereby forming a second a second etch mask on said second plurality of exposed end faces of said second wafer; and
  etching portions of said second end faces of said second wafer exposed through said second etch mask.

37. A method according to claim 35 wherein said generating step comprises the steps of:
  determining locations for each of said exposed end faces; and
  laying out said plurality of patterns on said photolithography mask using said locations.

38. A method according to claim 21 wherein each of said optical fibers and each of said optical rods has a width of approximately 1 mm or less.

39. A method according to claim 21 wherein each of said optical fibers and each of said optical rods has a width of approximately 500 microns or less.

40. A method according to claim 21 wherein each of said optical fibers has a uniform index of refraction along a cross section thereof.

41. A method according to claim 21 wherein each of said optical fibers has a gradient index of refraction along a cross section thereof.

42. A method of patterning an optical rod comprising:
arranging a plurality of optical rods into an array;
cutting said plurality of optical rods to form multiple wafers, wherein each of the optical rods in each wafer is aligned so that an exposed end face of each of said optical rods is oriented in a common direction;
patterning said exposed end faces of said optical rods so that said each of said exposed end faces has a three-dimensional pattern thereon, said patterning including performing photolithographic processes on said exposed end faces; and
separating said plurality of optical rods in a wafer from one another.

43. A method according to claim 42 wherein each of said optical rods has a width of approximately 500 microns or less.

44. A method according to claim 42 wherein said optical rod comprises a glass rod.

45. A method according to claim 42 wherein said three-dimensional pattern comprises a diffractive optical pattern so that said patterned end face has a stepped profile.

46. A method according to claim 42 wherein said three-dimensional pattern comprises a refractive optical pattern.

47. A method according to claim 42 wherein said three-dimensional pattern comprises a patterned layer so that a portion of said end face of said optical rod is covered by said patterned layer and so that a portion of said end face of said optical rod is exposed.

48. A method according to claim 47 wherein said patterned layer comprises a material chosen from the group consisting of a metal and a dielectric.

49. A method according to claim 42 further comprising the steps of:
forming a groove on a surface of a first substrate;
arranging said optical rod in said groove; and
bonding a second substrate on said surface of said first substrate so that said optical rod is in said groove between said first and second substrates.

50. A method according to claim 49 wherein said groove comprises a V-groove.

51. A method according to claim 42 wherein said patterning step is preceded by the step of:
polishing said end face of said optical rod.

52. A method according to claim 42 wherein said forming step comprises the steps of:
bonding a plurality of optical fibers into an array so that an axis of each of said optical fibers is aligned in parallel; and
cutting said bonded array of optical fibers along a direction perpendicular to said axis of each of said optical fibers thereby forming a bonded array of optical rods and exposing said end face of said optical rod.

53. A method according to claim 52 wherein said patterning step is followed by the step of:
separating said optical rod from said bonded array.

54. A method according to claim 52 wherein said optical fibers are bonded with an epoxy.

55. A method according to claim 52 wherein said array of optical fibers are bonded within an outer cylinder.

56. A method according to claim 42 wherein said patterning step comprises the steps of:
generating a photolithography mask including a pattern corresponding to said end face;
forming a photoresist layer on said end face;
transferring said pattern from said photolithography mask to said photoresist layer thereby forming an etch mask on said end face; and
etching portions of said end faces exposed through said etch mask.

57. A method according to claim 42 wherein said rod has a uniform index of refraction along a cross section thereof.

58. A method according to claim 42 wherein said rod has a gradient index of refraction along a cross section thereof.

59. A method according to claim 42 further comprising the step of:
optically coupling a radiation source to said cylindrical optical rod.

60. A method according to claim 42 further comprising the step of patterning a second end face of said rod opposite said first end face so that both of said end faces have three dimensional patterns thereon.

* * * * *